(12) United States Patent
Evans et al.

(10) Patent No.: US 7,211,971 B2
(45) Date of Patent: May 1, 2007

(54) LINEAR ACTUATOR (75) Inventors: Mark Evans, Farmington Hills, MI (US); Ross Miyao, Howell, MI (US); John Nunneley, Milford, MI (US); Lee Aho, South Lyon, MI (US)

(73) Assignee: Hitachi Automotive Products (USA), Inc., Harrodsburg, KY (US)

( * ) Notice: Subject to any disclaimer, the term of this patent is extended or adjusted under 35 U.S.C. 154(b) by 187 days.

(21) Appl. No.: 11/095,354

(22) Filed: Mar. 31, 2005

(65) Prior Publication Data

US 2006/0221518 A1 Oct. 5, 2006

(51) Int. Cl.
F16D 65/14 (2006.01)
B60K 23/08 (2006.01)

(52) U.S. Cl. .................. 318/14; 180/338; 180/344; 318/266; 318/286

(58) Field of Classification Search .......... 318/9, 318/14, 15, 566, 587, 283–286, 291–293, 318/466–470, 264–267; 180/337, 344, 347, 180/364, 178, 233, 247, 338
See application file for complete search history.

(56) References Cited

U.S. PATENT DOCUMENTS

| 2,444,886 A | 7/1948 | Vickers ..................... 74/459 |
| 2,854,113 A | 9/1958 | Hallden ..................... 192/141 |
| 2,978,621 A | 4/1961 | Martinek .................... 318/29 |
| 3,165,656 A | 1/1965 | Korthaus .................... 310/76 |
| 3,682,283 A | 8/1972 | Sato .......................... 192/141 |
| 3,742,303 A * | 6/1973 | Dageford .................... 361/22 |
| 4,095,570 A * | 6/1978 | Sheffer et al. .............. 123/438 |
| 4,414,630 A * | 11/1983 | Harris et al. ................. 701/79 |
| 4,677,355 A | 6/1987 | Baumann .................... 318/160 |
| 4,705,969 A * | 11/1987 | Gross ......................... 327/102 |
| 4,845,392 A | 7/1989 | Mumbower .................. 310/14 |
| 4,858,491 A | 8/1989 | Shube ......................... 74/665 |
| 4,902,953 A * | 2/1990 | Kraft et al. ................. 318/663 |
| 5,063,740 A * | 11/1991 | Aihara ........................ 60/432 |
| 5,267,635 A | 12/1993 | Peterson ..................... 192/84 |
| 5,712,548 A * | 1/1998 | Tice et al. .................. 318/293 |
| 5,788,008 A | 8/1998 | Fort ........................... 180/247 |
| 5,808,438 A * | 9/1998 | Jeffrey ....................... 318/634 |
| 5,823,636 A | 10/1998 | Parker ........................ 303/3 |
| 5,857,061 A * | 1/1999 | Chang et al. ............... 388/829 |
| 6,213,259 B1 | 4/2001 | Hanson ...................... 188/156 |
| 6,321,611 B1 | 11/2001 | Szu ............................ 74/89.37 |
| 6,508,139 B2 * | 1/2003 | Onodera ..................... 74/335 |
| 6,548,971 B2 * | 4/2003 | Gokturk ..................... 318/114 |
| 2003/0062727 A1 | 4/2003 | Reddmann .................. 292/197 |

* cited by examiner

*Primary Examiner*—Bentsu Ro
(74) *Attorney, Agent, or Firm*—Gifford, Krass, Sprinkle, Anderson, Citkowski, P.C.

(57) ABSTRACT

A linear actuator having a housing, a plunger slidably mounted to the housing between an extended and retracted position, and an electric motor drivingly connected to the plunger to move the plunger between its extended and retracted positions. A motor circuit controls the activation of the motor circuit and deactivates the motor circuit whenever the motor current exceeds a threshold value which varies as a function of the supply voltage to the electric motor and/or temperature. A memory storage unit stores the position of the plunger. Whenever the position of the plunger is in a state of transition between its retracted and extended position upon system initialization, the motor control circuit activates the motor to drive the plunger to a preselected extended or retracted position.

24 Claims, 6 Drawing Sheets

LINEAR ACTUATOR

BACKGROUND OF THE INVENTION

I. Field of the Invention

The present invention relates generally to linear actuators and, more particularly, to an electric motor driven linear actuator.

II. Description of Relevant Prior Art

There are many previously known linear actuators that are powered with electric motors. These previously known linear actuators typically comprise a housing having a plunger slidably mounted to the housing and movable between an extended and a retracted position. An electric motor is drivingly connected to the plunger to move the plunger between its extended and its retracted position in response to activation of the motor.

In many situations, it is desirable to move the linear actuator between preselected extended and retracted positions. In order to selectively deactivate the motor whenever the plunger reaches its retracted or extended position, these previously known linear actuators have typically employed limit switches which are activated by the plunger whenever the plunger is in its extended or retracted position.

These previously known linear actuators with limit switches, however, have not proven entirely satisfactory in use. One disadvantage of these previously known linear actuators with limit switches is that they oftentimes fail after extended and repeated use. When this occurs, the limit switch no longer deactivates the motor when the plunger reaches either its extended or retracted position in the desired fashion.

A still further disadvantage of these previously known linear actuators with limit switches is that the limit switches increase the overall cost of the linear actuator.

A still further disadvantage of these previously known linear actuators is that it is oftentimes desirable upon system initialization to determine if the linear actuator was in its extended position, its retracted position or a transition position in between the extended and retracted positions at system startup. For example, in the automotive industry such linear actuators are used, inter alia, to control the shift between a four-wheel and two-wheel drive transmission of an automotive vehicle. In the event that the linear actuator was in its retracted position or extended position at system startup, it would be normally desirable to leave the linear actuator in that position. Consequently, if an automotive vehicle was in the four-wheel transmission mode at engine startup, it would normally be desirable to simply leave the vehicle in the four-wheel transmission mode, or vice versa.

Conversely, if the linear actuator was in a state of transition between its extended and retracted positions upon engine startup or system initialization, it would be desirable to actuate the linear actuator to move to a preselected one of its extended and retracted positions on system initialization rather than leave the linear actuator in a transition position. The previously known linear actuators, however, fail to account for the condition where the linear actuator was in an intermediate position at the time of the last system shutdown and thus at the time of the next system initialization. Unless corrected upon system initialization, the partially actuated linear actuator may create unpredictable and undesirable results.

SUMMARY OF THE PRESENT INVENTION

The present invention provides a linear actuator which overcomes all of the above-mentioned disadvantages of the previously known linear actuators.

In brief, the linear actuator of the present invention comprises a housing with an electric motor mounted to the housing and powered by a power supply, typically a battery. The electric motor includes a rotary drive shaft which is rotatably driven when electrical power is applied to the motor.

A plunger is slidably mounted to the housing and movable between an extended and a retracted position. Additionally, a mechanical transmission assembly converts the rotary motion of the motor drive shaft to linear displacement of the plunger between its extended and its retracted position.

A motor control circuit or electronic control circuit (ECU) is also provided which deactivates the motor whenever the motor current exceeds a predetermined threshold which would occur, for example, whenever the plunger reaches either its extended or its retracted position and is prevented from further movement. When this occurs, the motor is effectively stopped or slowed which causes a corresponding increase in the motor current.

In order to ensure that the plunger is in its extended or its retracted position despite variations in the supply voltage to the motor and/or the ambient temperature, the motor control circuit also preferably includes an adjustment circuit which varies the threshold value as a function of the motor supply voltage and/or ambient temperature.

The motor control circuit also preferably includes a memory storage device which stores the status of the position of the plunger. The position status of the plunger may be either (1) a retracted position, (2) an extended position or (3) a transition position between the extended and the retracted positions. In the event that the stored status of the linear actuator indicates either a retracted or an extended position, no automatic activation of the linear actuator occurs upon system initialization. Conversely, if the stored status of the linear actuator is indicative of a transition position between its extended and its retracted position, the motor control circuit activates the motor to move the plunger to a preselected, last received or desired position

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 3:
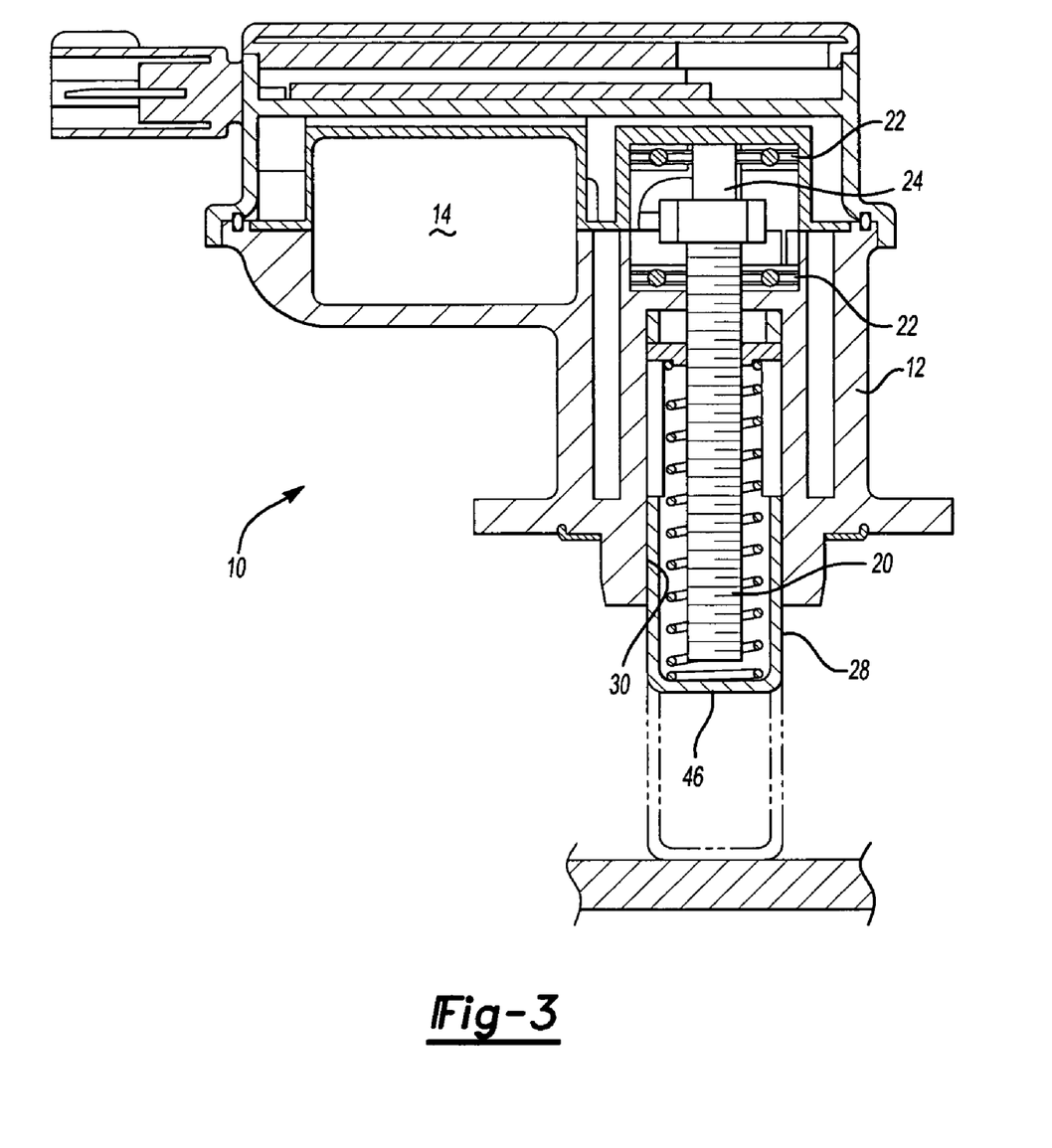
FIG. 3 is a sectional view illustrating the preferred embodiment of the present invention.
Figure 4:
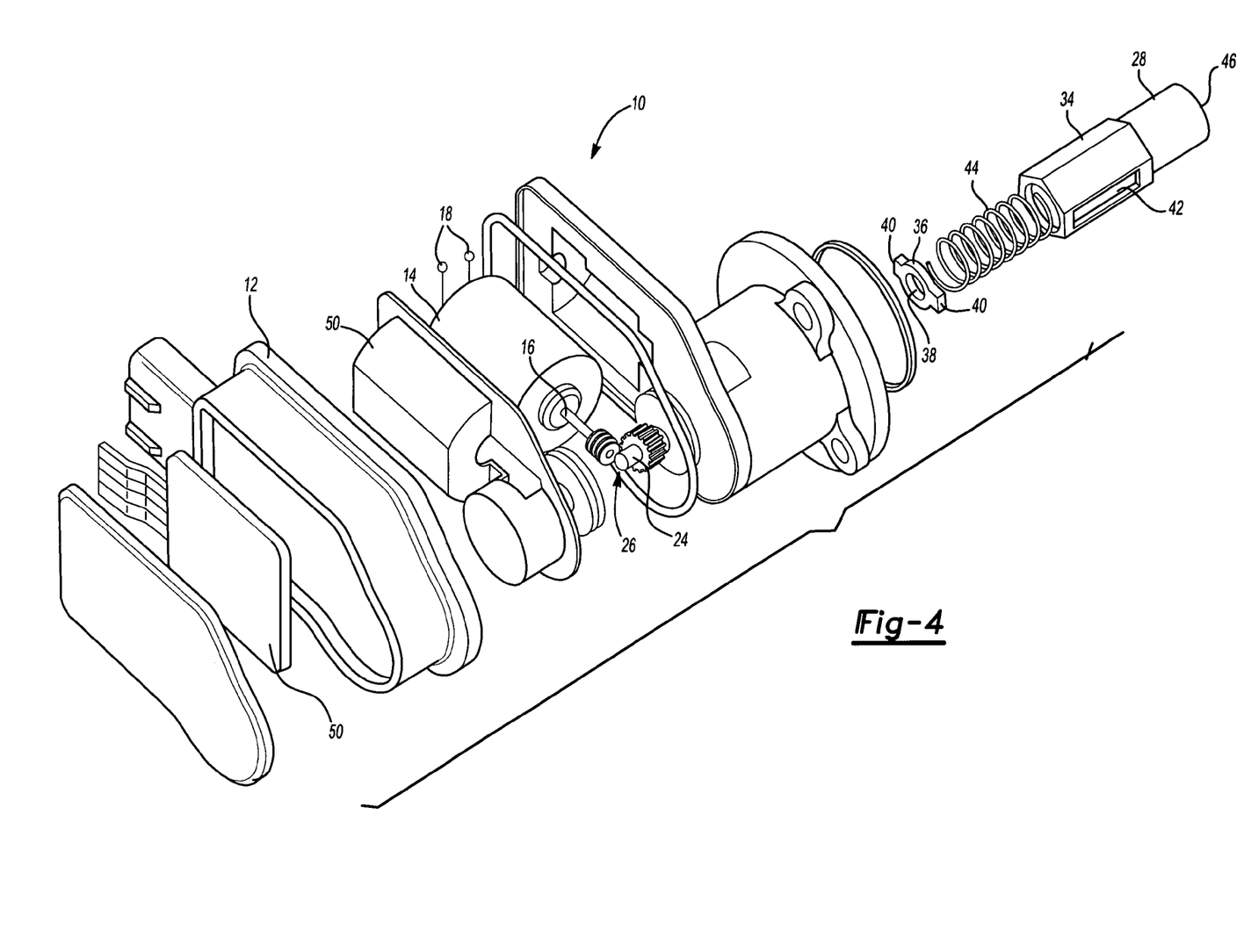
FIG. 4 is an exploded perspective view illustrating the preferred embodiment of the present invention.

With reference first to FIGS. 3 and 4, a preferred embodiment of the linear actuator 10 of the present invention is shown and comprises a housing 12 which is constructed of any suitable material, such as hard plastic, metal or the like. Furthermore, the housing 12 may be of either multi-piece or single-piece construction.

An electric motor 14 is mounted within the housing and has an output drive shaft 16 in response to voltage applied to two supply voltage terminals 18 on the motor 14. The polarity of the voltage on the supply terminals 18 determines the direction of rotation of the motor 14.

An externally threaded driven shaft 20 is rotatably mounted to the housing 12 by thrust washer assemblies 22 so that one end 24 of the shaft 20 is positioned adjacent the motor drive shaft 16. The washers also constrain the driven shaft 20 from axial movement.

Still referring to FIGS. 3 and 4, a gear arrangement 26, such as a worm gear arrangement, drivingly connects the motor drive shaft 16 to the end 24 of the driven shaft 20. Other types of gearing arrangements, such as a bevel gear arrangement, may also be used without deviation from the spirit or scope of the invention.

An elongated plunger 28 is longitudinally slidably disposed within a recess 30 formed in the housing 12 and movable between a retracted position, illustrated in solid line in FIG. 3, and an extended position, illustrated in phantom line in FIG. 3. Although the plunger 28 is longitudinally slidably mounted to the housing 12, it is constrained against rotational movement relative to the housing 12 by any conventional means. However, in the preferred embodiment of the invention, the outer periphery of the plunger 28 includes a noncircular cross-sectional portion 34 (FIG. 4) while the housing recess 30 has a complementary cross-sectional shape. The noncircular cross-sectional shape of the plunger portion 34, e.g. a polygonal shape, thus simply, but effectively, prevents rotation of the plunger 28 relative to the housing 12.

A drive washer 36 includes an internally threaded throughbore 38 which is threadably mounted to the driven shaft 20. The washer 36 includes a pair of outwardly protruding tabs 40. These outwardly protruding tabs 40 are, in turn, slidably positioned within longitudinally extending slots 42 formed in the plunger 28. The tabs 40 thus prevent rotation of the washer 36 relative to both the plunger 28 and the housing 12.

A compression spring 44 in a state of compression is disposed between the washer 36 and a closed end 46 of the plunger 28. The spring 44 thus maintains the closed end 46 of the plunger 28 at its maximum distance from the washer 36 but permits limited longitudinal movement of the plunger 28 relative to the washer 36. The relative motion between the plunger 28 and washer 36 is determined by the length of the slots 42 in the plunger 28.

In operation, activation of the motor 14 rotatably drives the driven shaft 20 via the gear arrangement 26. Rotation of the driven shaft 20 in turn axially displaces the washer 36 along the driven shaft 20 with the attached plunger 28 in the desired fashion.

Figure 1:
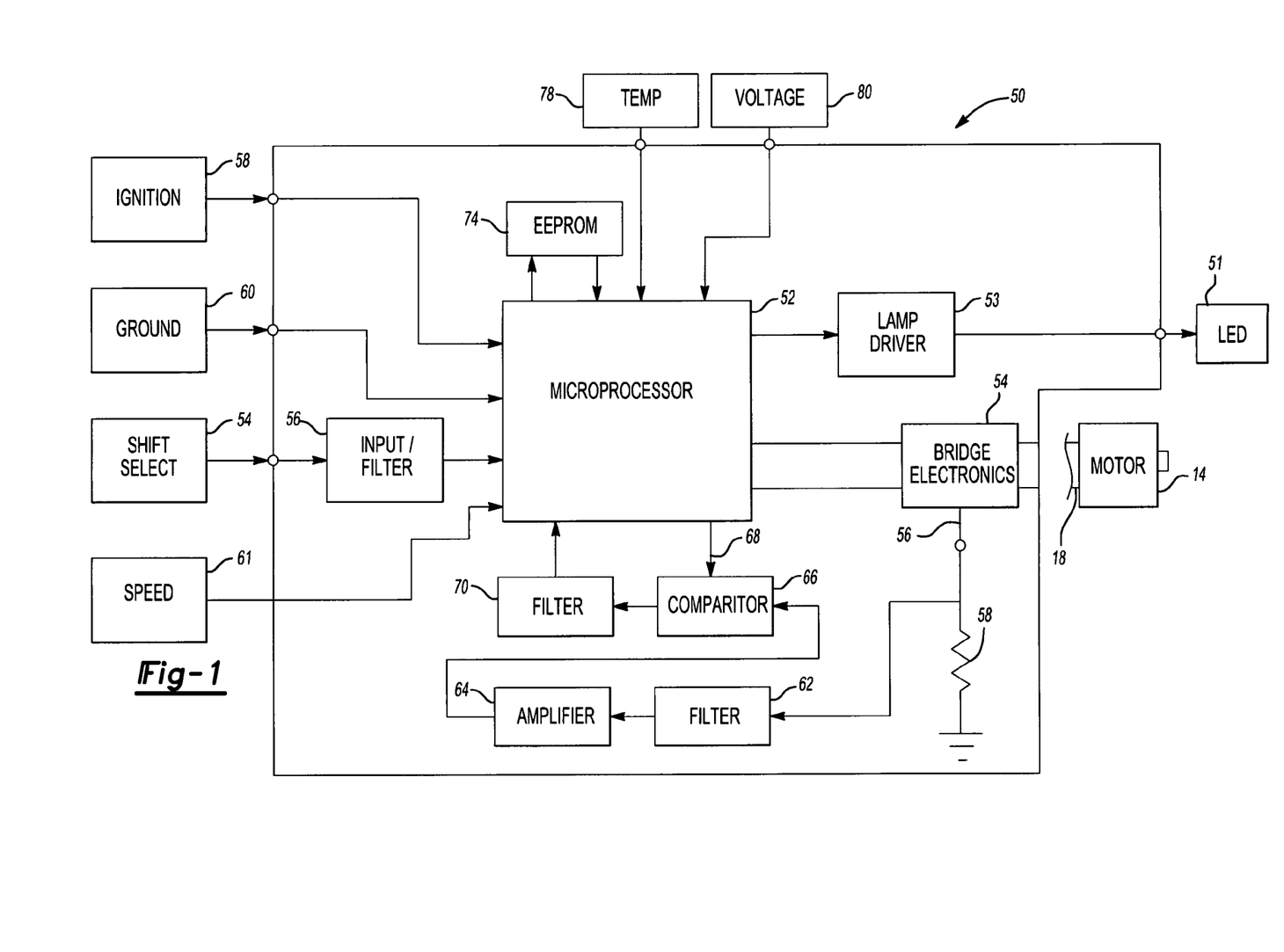
FIG. 1 is a block diagram schematic view illustrating a preferred embodiment of the present invention.

With reference now to FIGS. 1 and 4, a motor control circuit 50 is contained within the housing 12. The motor circuit 50 controls the actuation of the motor 14.

With reference now particularly to FIG. 1, the motor control circuit 50 is shown in greater detail and for an application where the linear actuator 10 is used to control the shift between a two-wheel and four-wheel drive for an automotive vehicle. It will be understood, however, that the utilization of the linear actuator 10 in an automotive vehicle shift is by way of example only and that no undue limitation should be drawn therefrom. Rather, the linear actuator 10 may be utilized in any application requiring a linear actuator, e.g. a vehicle hood release, a vehicle gas cap release, a vehicle trunk release, etc. as well as non-automotive applications such as security systems.

With reference then particularly to FIG. 1, the motor control circuit or ECU 50 includes a processor 52, such as a microprocessor, PLA or the like, which receives an input signal from a selector 54 indicative of the desired position of the linear actuator 10, i.e. with the plunger 28 in its retracted position, its extended position and/or an intermediate position. The signal from the selector 54 is coupled as an input signal through a filter 56 to the microprocessor 52. The microprocessor 52 also optionally receives an input signal from an ignition key 58 indicative of whether or not the ignition system has been activated, as well as a ground 60.

The microprocessor 52 generates output signals to a conventional bridge electronic circuit 54 which controls the activation of the motor 14. An output 56 from the bridge electronic circuit 54 is connected by a resistor 58 to ground and the voltage on the output 56 from the bridge electronic circuit 54 is proportional to the motor current.

The output 56 from the bridge electronic circuit 54 is also coupled through a filter 62 and amplifier 64 to a comparator 66. The comparator 66 then compares the signal from the amplifier 64 to a current threshold value which is set by an output signal on line 68 from the microprocessor 52. Whenever the motor current exceeds the threshold value as set by the output signal from the microprocessor 52 on line 68, the comparator 66 generates an output signal to a filter 70 which is in turn connected as an input signal to the microprocessor 52. Upon receipt of the signal from the filter 70, the microprocessor 52 generates output signals to the bridge electronic circuit 54 to deactivate the motor 14.

Still referring to FIG. 1, a memory storage device 74, such as an EEPROM, is electrically connected to the microprocessor 52. As subsequently described in greater detail, the position status of the linear actuator is stored by the microprocessor in the memory storage device 74. The position status of the linear actuator may include (1) a retracted position, (2) an extended position or (3) a transition position between the retracted and extended positions and, optionally, an intermediate position.

The microprocessor 52 also preferably receives an input signal from a temperature sensor 78 indicative of the ambient temperature of the motor 14. Similarly, a voltage sensor 80 also provides an input signal to the microprocessor 52 indicative of the voltage on the voltage terminals 18 of the motor 14. Typically, a drive voltage applied to the voltage terminals 18 of the motor 14 is the same as the battery voltage for the automotive vehicle. Additionally, the microprocessor 52 optionally receives a signal from a speed sensor 61 representative of the vehicle speed.

The microprocessor also selectively activates or deactivates an indicator 51 through a device driver 53 to indicate whether the actuator is in its extended or retracted position.

Figure 2A:
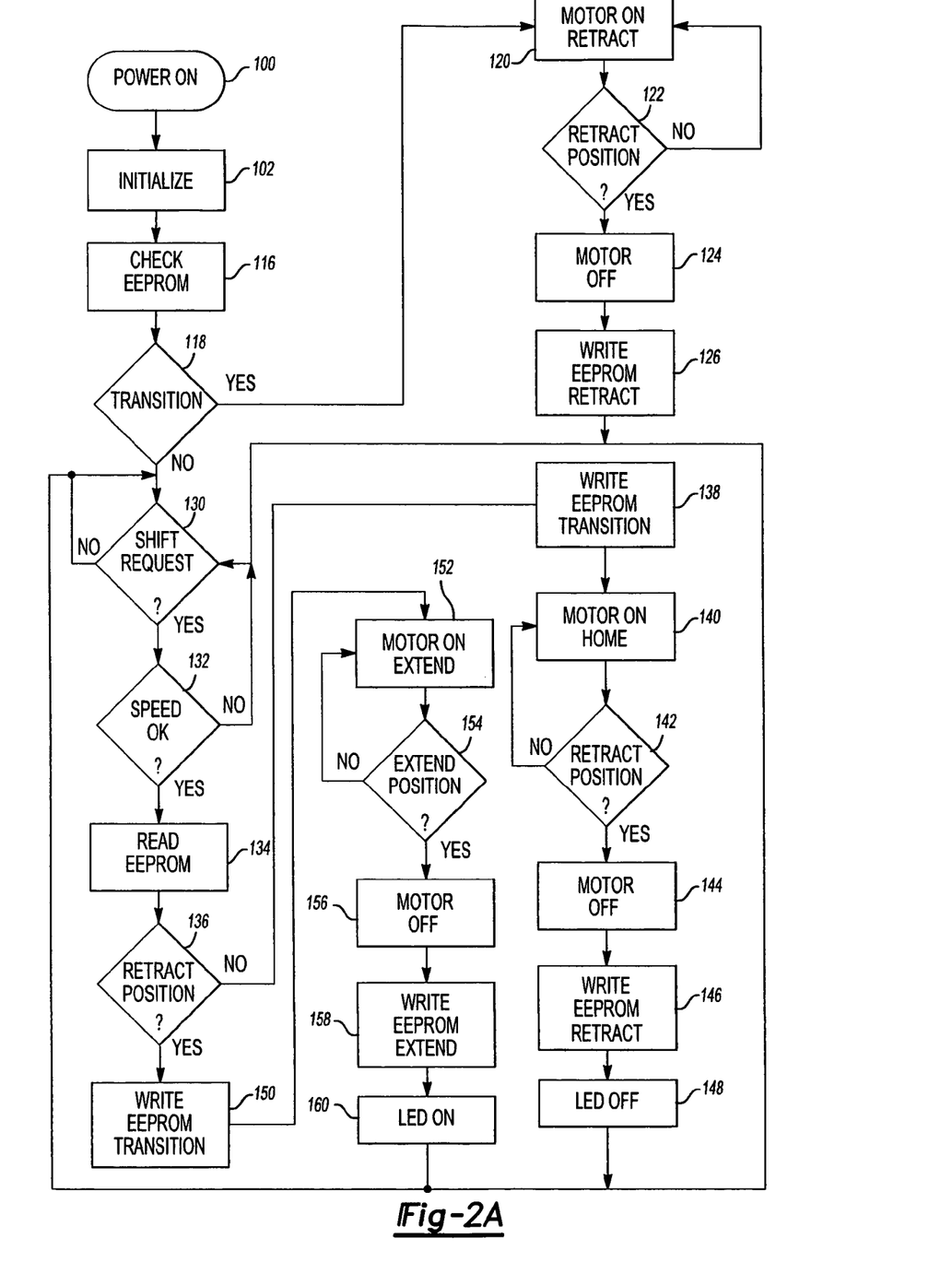
FIG. 2A is a flowchart illustrating the operation of the preferred embodiment of the present invention.
Figure 5:
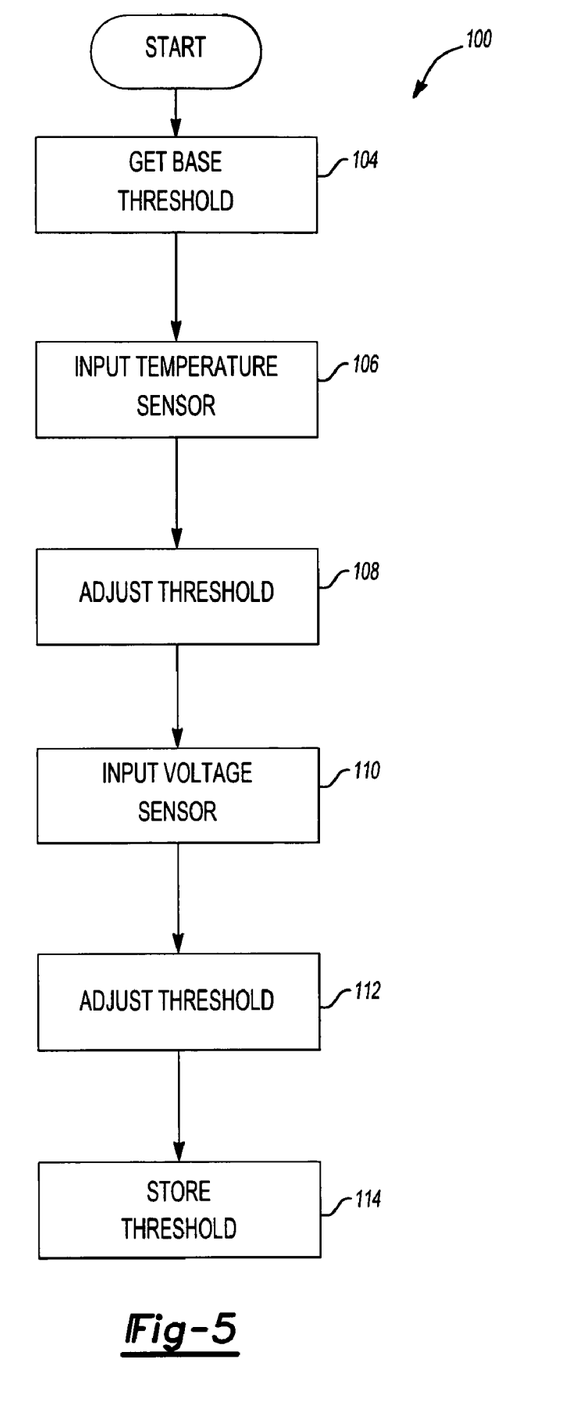
FIG. 5 is a flowchart illustrating another aspect of the operation of the preferred embodiment of the present invention.

With reference now to FIGS. 2A and 5, after energization of the motor control circuit at step 100, the microprocessor enters an initialization subroutine at step 102. The initialization routine is illustrated in greater detail in FIG. 5. With reference then to FIG. 5, the initialization routine 100 first retrieves a stored base current threshold value at step 104 and then proceeds to step 106.

At step 106, the microprocessor inputs the output signal from the temperature sensor. Step 106 then proceeds to step 108 where the microprocessor 52 adjusts the value of the base threshold acquired at step 104 as a function of the temperature as determined by the temperature sensor 78. Typically a higher temperature would result in a downward adjustment of the threshold.

Step 108 then proceeds to step 110 in which the microprocessor 52 inputs the voltage signal from the voltage sensor 80. Step 110 then proceeds to step 112 where the base threshold acquired at step 104 and previously modified at step 108 is again modified to reflect the voltage signal from the voltage sensor 80 which typically represents the amount of voltage available to power the motor 14. The adjusted threshold is then stored at step 114 in memory by the microprocessor 52. Typically, a higher voltage would result in an upward adjustment of the threshold.

With reference again to FIG. 2, after system initialization at step 102, the microprocessor proceeds to step 116 where the microprocessor 52 inputs the position status value of the linear actuator 10 from the memory storage device 74. The stored position status is representative of the position of the plunger 28 at the time of the last system shutdown. Step 116 then proceeds to step 118.

At step 118, the microprocessor determines if the status position of the linear actuator at engine startup at step 100 was in a state of transition between the retracted position and the extended position. If so, step 118 branches to step 120 which activates the motor to move the plunger to a preselected position of either the retracted position or the extended position. As shown by way of example only at step 120, the preselected position under these conditions is to return the linear actuator 10 to its retracted or home position.

After activation of the motor 14, step 120 branches to step 122. Step 122 then determines if the motor current exceeds the predetermined threshold as adjusted by the initialization step 102 by inputting the output signal from the comparator 66 via the filter 70.

In the event that the motor current is less than the predetermined adjusted threshold, step 122 branches to step 120 which continues activation of the motor 14. Conversely, when the motor current exceeds the adjusted threshold value, which would occur when the rotation of the driven shaft 20 is halted, step 122 instead branches to step 124 and deactivates the motor 14. Step 124 then proceeds to step 126 where the microprocessor 52 writes a value to the memory storage device 74 indicative that the actuator is in its retracted position and then proceeds to step 128 and deactivates the indicator 51 thus indicating a completion of the motor activation program.

Conversely, if the linear actuator was in either its retracted or its extended position at system initialization, step 118 instead branches to step 130 which determines whether or not there is a shift request requiring activation of the linear actuator 10 by the system. If not, step 130 continuously loops back to itself until such a request is received.

Upon receipt of a shift request, step 130 branches to step 132. In the example utilized in this disclosure, i.e. where the linear actuator 10 is used to activate a shift between a two-wheel and four-wheel drive, such a shift can only occur within a certain speed range. Consequently, step 122 determines, after inputting the value from the speed sensor 61, whether or not, once a shift request has been received, the vehicle is within that speed range. If not, step 132 branches back to step 130 without activating the motor 14. Otherwise, step 132 proceeds to step 134.

At step 134, the microprocessor 52 reads the memory storage device 74 and determines if the stored position status of the linear actuator represents the retracted or home position of the linear actuator 10. If not, step 136 branches to step 137 where the target position ("home") is stored in memory. Step 137 then proceeds to step 138 where the position status data is stored in the memory storage device 74 indicative that the linear actuator is in a transition position between its retracted and its extended position. Step 138 then proceeds to step 140.

Conversely, if the microprocessor 52 determines at step 136 that the linear actuator was initially at its extended position, step 136 instead branches to step 149 where the destination position is stored in memory. Step 149 then proceeds to step 150 where the microprocessor 52 writes a transition position status signal to the memory storage device 74 indicative that the linear actuator is in a transitional position between its extended and its retracted position. Step 150 then proceeds to step 152.

At step 152, the microprocessor 52 activates the motor 14 via the bridge electronics 54 to move the actuator from its home or retracted position and to its extended 4WD position. Step 152 then proceeds to step 154 which determines when the linear actuator reaches its extended position by determining when the motor current exceeds a predetermined but adjusted threshold. Step 154 operates in the same manner as previously described step 122 so that a further description thereof is unnecessary.

Step 154 maintains activation of the motor 14 by looping back through step 152 until the extended position is reached. When that occurs, step 154 instead branches to step 156 which deactivates the motor. Step 156 then proceeds to step 158 where the microprocessor 52 writes a position status value to the memory storage device 74 indicative that the linear actuator is in its extended position. Step 158 then proceeds to step 160 where the indicator 51 is illuminated.

After the indicator 51 has been activated at step 160 or reactivated at step 128, the program branches back to step 130 to await the next shift change.

Consequently, as should be clear from the foregoing, following initialization of the system after a power startup, the microprocessor 52 first determines whether or not the linear actuator was in a state of transition between its extended and its retracted position during the previous shutdown and thus at the current startup time or system initialization. If so, the linear actuator is activated to move the linear actuator to a preselected one of either the retracted position or the extended position; it does not matter which, except that it is predetermined prior to system startup. Conversely, if the linear actuator is in either its extended or its retracted position at initialization of the system, it remains so after startup.

In the flowchart of FIG. 2A, whenever the linear actuator is in a transition position status upon system initialization, the motor is actuated to drive the motor to its home or retracted position. Alternatively, the microprocessor 52 may be programmed to activate the motor to complete the requested activation upon system initialization.

Figure 2B:
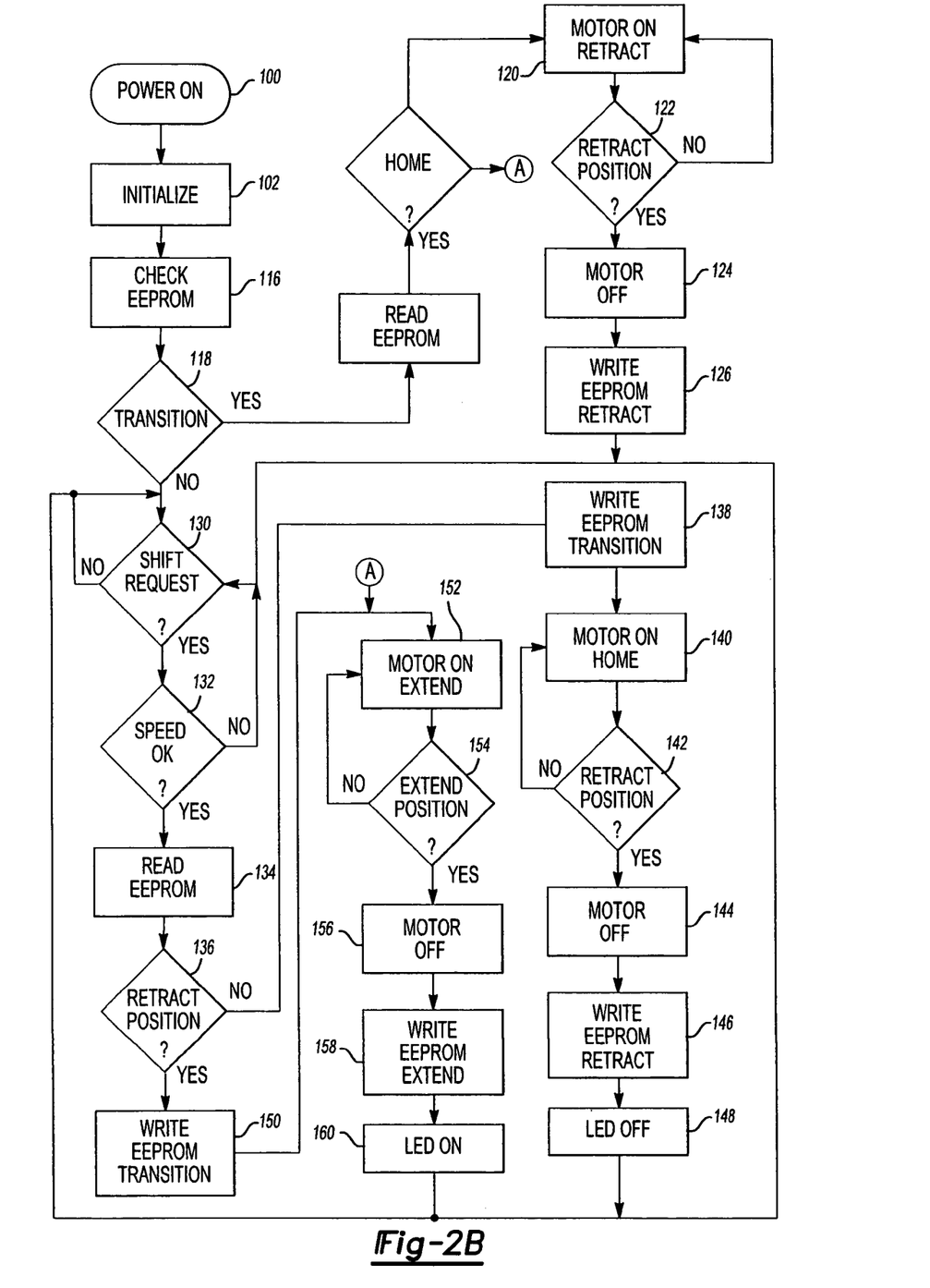
FIG. 2B is a flowchart similar to FIG. 2A, but illustrating a modification thereof.

For example, with reference to FIG. 2B, a modified flowchart is illustrated in which, in the event the actuator is in a state of transition upon system initialization, step 118 instead branches to step 190 where the microprocessor 52 reads the stored value from memory representative of the requested destination for the actuator. Step 190 then proceeds to step 192.

At step 192 the program determines if the retracted or home position is the requested destination. If so, step 192 proceeds to step 120 and activates the motor to move the actuator to the home position in the previously described fashion. Otherwise, step 192 branches to step 152 and actuates the actuator to its extended or 4WD position as previously described.

From the foregoing, it can be seen that the present invention provides a linear actuator with a unique motor control circuit. More specifically, the motor control circuit of the present invention determines whether or not the linear actuator has reached its retracted or its extended position by comparing the motor current to a predetermined threshold. Whenever the predetermined threshold is exceeded, indicative that the motor is in either its fully extended or fully retracted position, the motor is deactivated. Consequently, the present invention determines full extension or full retraction of the linear actuator without the previously known necessity of limit switches or the like.

Additionally, the present invention provides a system to selectively adjust the current threshold necessary for the determination that the motor is in its fully extended or fully retracted position as a function of temperature and/or voltage. Consequently, the motor control circuit of the present invention determines whether or not the full extension or full retraction of the linear actuator has been achieved even though the linear actuator is subjected to widely varying environmental conditions.

Furthermore, although the actuator has been described as movable between two positions, the actuator is optionally movable to one or more predefined intermediate positions. For example, an increase in friction between the plunger and housing at an intermediate position would cause a corresponding increase in motor current which, when sensed by the microprocessor, could be used to deactivate the motor at the intermediate position.

Having described our invention, however, many modifications thereto will become apparent to those skilled in the art to which it pertains without deviation from the spirit of the invention as defined by the scope of the appended claims.

We claim:

1. A linear actuator comprising:
   a housing,
   an electric motor having a supply voltage and a rotary drive shaft,
   a plunger slidably mounted to said housing and movable between an extended position and a retracted position,
   a mechanical transmission assembly which converts rotary motion of said motor drive shaft to linear displacement of said plunger between said extended position and said retracted position,
   a motor control circuit which deactivates said motor when the motor current exceeds a threshold value upon halting of said motor drive shaft, said motor control circuit including an adjustment circuit which varies said threshold value as a function of a sensed condition.

2. The invention as defined in claim 1 wherein said sensed condition comprises a supply voltage.

3. The invention as defined in claim 1 wherein said sensed condition comprises temperature.

4. The invention as defined in claim 1 wherein said mechanical transmission assembly comprises a threaded driven shaft rotatably mounted to said housing, a nut threadably attached to said driven shaft, said nut being attached to said plunger and constrained against rotation relative to said driven shaft, and a gear arrangement which rotatably drivingly connects said motor drive shaft and said driven shaft.

5. The invention as defined in claim 4 wherein said gear arrangement comprises a worm gear.

6. The invention as defined in claim 4 wherein said nut is slidably mounted to said plunger and movable between an extended position and a retracted position, and comprising a compression spring disposed between said nut and said plunger.

7. The invention as defined in claim 4 and comprising a thrust bearing operatively disposed between said driven shaft and said housing.

8. The invention as defined in claim 1 wherein said plunger has a noncircular cross-sectional shape, said plunger being slidably mounted in a recess in said housing having a cross-sectional shape complementary to the cross-sectional shape of said plunger.

9. The invention as defined in claim 1 wherein said motor control circuit comprises a processor and wherein said adjustment circuit comprises a comparator which receives a first input signal representative of said threshold value and a second input representative of the motor current, said comparator generating an output signal to said processor when said motor current exceeds said threshold value.

10. A liner actuator comprising:
    a housing,
    an electric motor having a rotary drive shaft,
    a plunger slidably mounted to said housing and movable between an extended position and a retracted position,
    a mechanical transmission assembly which converts rotary motion of said motor drive shaft to linear displacement of said plunger between said extended position and said retracted position,
    a motor control circuit having a memory storage device, a storage circuit which stores a position status of said plunger of whether said plunger is in said retracted position, said extended position or a transition position between said retracted position and said extended position, and a motor activation circuit which activates said motor on system initialization to move said plunger to a one of said extended position and said retracted position whenever said position status stored in said memory storage device is in said transition position.

11. The invention as defined in claim 10 wherein said one of said extended position and said retracted position comprises a stored target position.

12. The invention as defined in claim 10 wherein said one of said extended position and said retracted position comprises a predetermined retracted position or extended position.

13. The invention as defined in claim 10 wherein said mechanical transmission assembly comprises a threaded driven shaft rotatably mounted to said housing, a nut threadably attached to said driven shaft, said nut being attached to said plunger and constrained against rotation relative to said driven shaft, and a gear arrangement which rotatably drivingly connects said motor drive shaft and said driven shaft.

14. The invention as defined in claim 13 wherein said gear arrangement comprises a worm gear.

15. The invention as defined in claim 13 wherein said nut is slidably mounted to said plunger and movable between an extended position and a retracted position, and comprising a compression spring disposed between said nut and said plunger.

16. The invention as defined in claim 13 and comprising a thrust bearing operatively disposed between said driven shaft and said housing.

17. The invention as defined in claim 10 wherein said plunger has a noncircular cross-sectional shape, said plunger being slidably mounted in a recess in said housing having a cross-sectional shape complementary to the cross-sectional shape of said plunger.

18. A method for controlling a linear actuator having a plunger mounted to a housing and electric motor mechanically coupled to plunger comprising the steps of:

sensing an ambient condition, thereafter adjusting a motor current threshold value as a function of the sensed ambient condition, following activation of the motor, deactivating the motor when the motor current exceeds the adjusted current threshold value.

19. The invention as defined in claim 18 wherein the sensed condition comprises temperature.

20. The invention as defined in claim 18 wherein the sensed condition comprises a supply voltage for the motor.

21. A method for controlling a linear actuator having a plunger movable between a retracted and an extended position mounted to a housing and electric motor mechanically coupled to plunger comprising the steps of:

storing a position status value in memory indicative of whether said plunger is in a retracted position, an extended position or a transition position between said retracted position and said extended position.

reading the stored position status value upon system initialization, and activating the motor to move the plunger to one of said retracted position or said extended position in dependence on the stored position status value.

22. The invention as defined in claim 21 and further comprising the steps of:

following activation of the motor, deactivating the motor when motor current exceeds a threshold value, and adjusting the threshold value as a value of a sensed condition.

23. The invention as defined in claim 22 wherein the sensed condition comprises temperature.

24. The invention as defined in claim 23 wherein the sensed condition comprises the motor supply voltage.

* * * * *